(12) United States Patent
Zhang (10) Patent No.: US 12,532,182 B2
(45) Date of Patent: Jan. 20, 2026

(54) METHOD AND APPARATUS FOR PROCESSING LOCATION-BASED SERVICE DATA

(71) Applicants: JINGDONG TECHNOLOGY HOLDING CO., LTD., Beijing (CN); BEIJING TONGBANGZHUOYI TECHNOLOGY CO., LTD., Beijing (CN)

(72) Inventor: Zuoyi Zhang, Beijing (CN)

(73) Assignees: JINGDONG TECHNOLOGY HOLDING CO., LTD., Beijing (CN); BEIJING TONGBANGZHUOYI TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 18/550,476

(22) PCT Filed: Dec. 23, 2021

(86) PCT No.: PCT/CN2021/140850
§ 371 (c)(1),
(2) Date: Sep. 14, 2023

(87) PCT Pub. No.: WO2022/193771
PCT Pub. Date: Sep. 22, 2022

(65) Prior Publication Data
US 2024/0155350 A1     May 9, 2024

(30) Foreign Application Priority Data
Mar. 15, 2021   (CN) .......................... 202110276087.5

(51) Int. Cl.
*H04W 12/63*     (2021.01)
*G06F 21/62*     (2013.01)
(Continued)

(52) U.S. Cl.
CPC ........ *H04W 12/63* (2021.01); *G06F 21/6254* (2013.01); *H04W 12/02* (2013.01);
(Continued)

(58) Field of Classification Search
CPC ... H04W 12/63; H04W 12/02; G06F 21/6254; G06F 2221/2111; G16Y 30/10; G16Y 40/50; H04L 63/0421
See application file for complete search history.

(56) References Cited

U.S. PATENT DOCUMENTS

2004/0203900 A1* 10/2004 Cedervall ............. H04W 4/025
                                              455/457
2006/0195570 A1*  8/2006 Zellner .................. H04W 4/02
                                              709/224
(Continued)

FOREIGN PATENT DOCUMENTS

CN    102523273 A    6/2012
CN    103703748 A    4/2014
(Continued)

OTHER PUBLICATIONS

A. Escudero-Pascual and G. Q. Maguire, "Role(s) of a proxy in location based services," The 13th IEEE International Symposium on Personal, Indoor and Mobile Radio Communications, Lisbon, Portugal, 2002, pp. 1252-1256 vol.3, doi: 10.1109/PIMRC.2002.1045229 (Year: 2002).*

(Continued)

*Primary Examiner* — Robert B Leung
(74) *Attorney, Agent, or Firm* — Qinghong Xu (57) ABSTRACT

The present disclosure provides a method and an apparatus for processing location-based service data, an electronic device, and a computer readable storage medium. The method includes: receiving a location service request sent by an IoT terminal, the location service request including a real
(Continued)

address of the IoT terminal, location information, a type of the location service request, and a location service provider; replacing the real address of the IoT terminal in the location service request with a temporary address using a smart contract, and sending a replaced location service request to the location service provider; receiving a location service response sent by the location service provider; and replacing the temporary address included in the location service response with the real address using the smart contract, and sending a replaced location service response to the IoT terminal.

18 Claims, 4 Drawing Sheets

(51) Int. Cl.
  *G16Y 30/10* (2020.01)
  *G16Y 40/50* (2020.01)
  *H04L 9/40* (2022.01)
  *H04W 12/02* (2009.01)

(52) U.S. Cl.
  CPC ....... *G06F 2221/2111* (2013.01); *G16Y 30/10* (2020.01); *G16Y 40/50* (2020.01); *H04L 63/0421* (2013.01)

(56) References Cited

U.S. PATENT DOCUMENTS

| | | | |
|---|---|---|---|
| 2012/0040681 A1 | 2/2012 | Yan et al. | |
| 2013/0135041 A1* | 5/2013 | Slupsky | H01L 23/58 327/564 |
| 2018/0124013 A1* | 5/2018 | Theogaraj | H04L 61/251 |
| 2020/0014720 A1 | 1/2020 | Giura | |
| 2020/0244655 A1* | 7/2020 | Gundavelli | H04W 12/02 |
| 2022/0224669 A1* | 7/2022 | Bouvet | H04L 61/2539 |

FOREIGN PATENT DOCUMENTS

| | | |
|---|---|---|
| CN | 107045650 A | 8/2017 |
| CN | 110119430 A | 8/2019 |
| CN | 110609884 A | 12/2019 |
| CN | 110765472 A | 2/2020 |
| CN | 111277608 A | 6/2020 |
| JP | 2003069605 A | 3/2003 |
| JP | 2005236523 A | 9/2005 |
| JP | 2010282401 A | 12/2010 |
| KR | 102214647 B1 | 2/2021 |
| WO | 2020125840 A1 | 6/2020 |

OTHER PUBLICATIONS

Z. Geng et al., "Poster: Smart-Contract Based Incentive Mechanism for K-Anonymity Privacy Protection in LBSs," 2017 IEEE Symposium on Privacy-Aware Computing (PAC), Washington, DC, USA, 2017, pp. 200-201, doi: 10.1109/PAC.2017.33. (Year: 2017).*
S. D. Levi et al., "An Introduction to Smart Contracts and Their Potential and Inherent Limitations," Posted on May 26, 2018, Retrieved on Apr. 1, 2025 from [https://corpgov.law.harvard.edu/2018/05/26/an-introduction-to-smart-contracts-and-their-potential-and-inherent-limitations/]. (Year: 2018).*
A. S. Omar and O. Basir, "Identity Management in IoT Networks Using Blockchain and Smart Contracts," 2018, 2018 IEEE International Conference on Internet of Things (iThings), Halifax, NS, Canada, 2018, pp. 994-1000, doi: 10.1109/Cybermatics_2018.2018. 00187. (Year: 2018).*
International Search Report dated Mar. 22, 2022 of International Application No. PCT/CN2021/140850.
Feng, Yafei et al."Structural Features and Hot Spots of Domestic Privacy Research in the Past 20 Years",Jan. 26, 2020.
Notice of Allowance dated Sep. 10, 2024 of Japanese Application No. 2023-557103.
Notice of Allowance dated Nov. 20, 2025 of Chinese Application No. 202110276087.5.

* cited by examiner

METHOD AND APPARATUS FOR PROCESSING LOCATION-BASED SERVICE DATA

CROSS REFERENCE TO RELATED APPLICATIONS

This application is a U.S. national phase application of International Application No. PCT/CN2021/140850, filed on Dec. 23, 2021, which claims priority to Chinese Patent Application No. 202110276087.5, filed on Mar. 15, 2021 and entitled "METHOD AND APPARATUS FOR PROCESSING LOCATION-BASED SERVICE DATA", the entire contents of which are incorporated herein by reference.

TECHNICAL FIELD

The present disclosure relates to the field of computer technology, in particular to a method and an apparatus for processing location-based service data, an electronic device, and a computer-readable storage medium.

BACKGROUND

In an era of digital economy, importance of data security and privacy protection is increasingly prominent, especially protection of user privacy data represented by Location Based Services (LBS), which is becoming an attention focus in industry. In the related art, an operating system such as IOS and Android provides location based services for IoT (Internet of Things) terminals.

SUMMARY

Embodiments of the present disclosure provide a method for processing location-based service data, applied to a blockchain, including: receiving a location service request sent by an IoT terminal, wherein the location service request includes a real address of the IoT terminal, location information, a type of the location service request, and a location service provider; replacing the real address of the IoT terminal in the location service request with a temporary address using a smart contract, and sending a replaced location service request to the location service provider; receiving a location service response sent by the location service provider, wherein the location service response includes the temporary address, and response information generated by the location service provider based on the location information and the type of the location service request; and replacing the temporary address in the location service response with the real address using the smart contract, and sending a replaced location service response to the IoT terminal.

Embodiments of the present disclosure provide an apparatus for processing location-based service data, applied to a blockchain, including: a first reception module configured to receive a location service request sent by an IoT terminal, wherein the location service request includes a real address of the IoT terminal, location information, a type of the location service request, and a location service provider; a first replacement module configured to replace the real address of the IoT terminal in the location service request with a temporary address using a smart contract, and send a replaced location service request to the location service provider; a second reception module configured to receive a location service response sent by the location service provider, wherein the location service response includes the temporary address, and response information generated by the location service provider based on the location information and the type of the location service request; and a second replacement module configured to replace the temporary address in the location service response with the real address using the smart contract, and send a replaced location service response to the IoT terminal.

Embodiments of the present disclosure provide an electronic device, including: a memory for storing a computer program; and a processor for executing the computer program, wherein steps of the method for processing location-based service data described above are performed when the computer program is executed by the processor.

Embodiments of the present disclosure provide a computer-readable storage medium having a computer program stored thereon, which when executed by a processor, cause steps of the method for processing location-based service data described above to be performed.

It should be understood that the general description above and the detailed description in the following are only illustrative and do not limit the present disclosure.

BRIEF DESCRIPTION OF THE DRAWINGS

In order to provide a clearer explanation of embodiments of the present disclosure or technical solutions in the prior art, a brief introduction will be given to the drawings required in the description of embodiments or prior art. It is evident that the drawings in the following description are only some embodiments of the present disclosure. For those of ordinary skill in the art, other drawings can be obtained based on these drawings without any creative effort. The drawings are intended to provide a further understanding of the present disclosure and constitute a part of the specification, which serve to explain the present disclosure together with the detailed description below, but do not constitute a limitation on the present disclosure, in which.

DETAILED DESCRIPTION

A clear and complete description of technical solutions in the embodiments of the present disclosure will be provided in the following, in conjunction with the drawings. It is evident that the embodiments described are only a part but not all of embodiments of the present disclosure. Based on embodiments of the present disclosure, all other embodiments obtained by those of ordinary skill in the art without any creative effort fall within the protection scope of the present disclosure. In addition, in embodiments of the present disclosure, "first", "second", and the like are used to distinguish similar objects, without necessarily describing a specific order or sequence.

Embodiments of the present disclosure disclose a method for processing location-based service data, and the method improves the security of the real address of IoT terminals.

Figure 1:
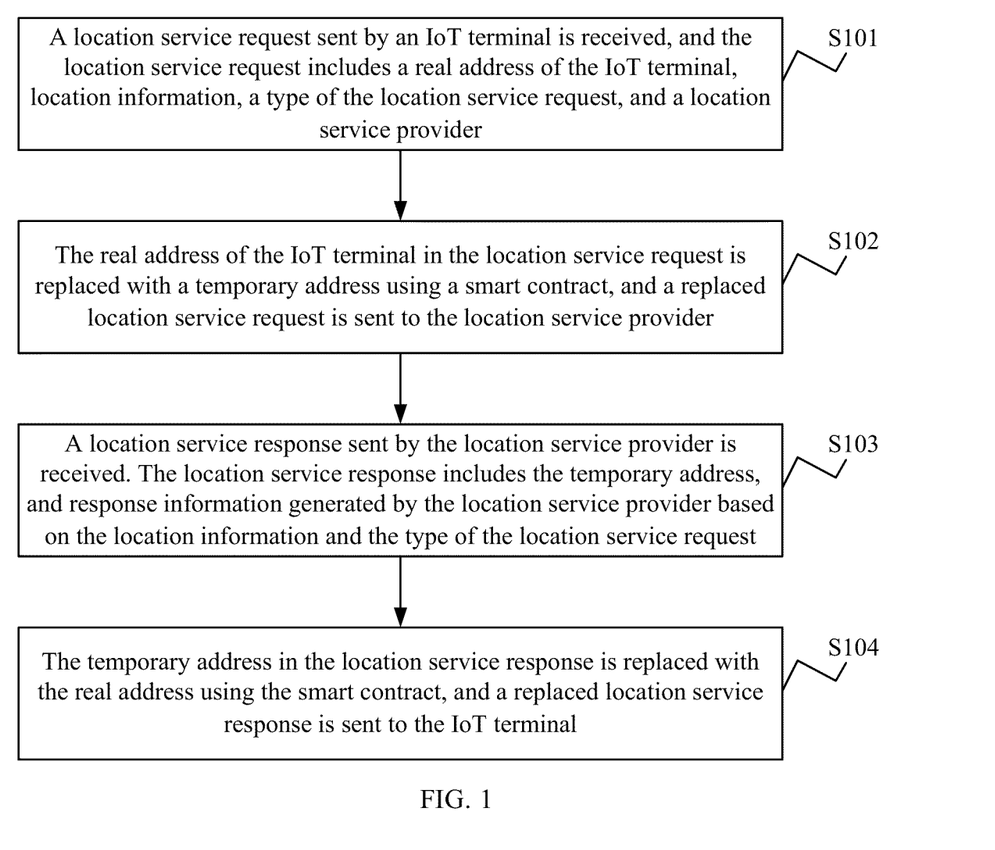
FIG. 1 is a flowchart of a method for processing location-based service data according to some embodiments of the present disclosure.

Reference is made to FIG. 1, a flowchart of a method for processing location-based service data according to embodiments of the present disclosure is provided. As shown in FIG. 1, the method includes following steps.

In step S101, a location service request sent by an IoT terminal is received. The location service request includes a real address of the IoT terminal, location information, a type of the location service request, and a location service provider.

The execution entity of embodiments of the present disclosure is a blockchain, which is located between the IoT terminal and the location service provider, achieving communication between the IoT terminal and the location service provider. The IoT terminal in embodiments of the present disclosure can include mobile phones, vehicles, etc. The location service provider can include operating systems such as IOS and Android, which is not limited specifically herein. The blockchain in embodiments of the present disclosure includes a service node corresponding to the location service provider, through which the blockchain communicates with the corresponding location service provider. The service node adopts a minimum data storage scheme and only stores location service information related to the corresponding location service provider. The blockchain also includes a supervision node corresponding to a supervisory department, which adopt a full data storage scheme to store all location service information, achieving effective supervision by the supervisory department on location services provided by the location service provider and ensuring the compliance of location based services.

In some embodiments, the IoT terminal sends the location service request to the blockchain, and the location service request includes the real address of the IoT terminal, the location information, the type of the location service request, and the location service provider. In some embodiments, other content can also be included, which is not limited specifically herein. The real address of the IoT terminal is, for example, a real IP (Internet Protocol) address and a real Mac (Media Access Control) address of the IoT terminal. The type of the location service request is, for example, weather information corresponding to the location information, that is, the corresponding weather information through which the location service request uses to request the location information of the IoT terminal.

It can be understood that after this step, the location service request can also be sent to the supervision node for storage, that is, the location service information stored by the supervision node includes the location service request sent by the terminal device.

In step S102, the real address of the IoT terminal in the location service request is replaced with a temporary address using a smart contract, and a replaced location service request is sent to the location service provider.

In some embodiments, the blockchain uploads the location service request sent by the IoT terminal on-chain and automatically replaces the real address in the location service request with the temporary address using the smart contract. In some embodiments, the blockchain adopts an off-chain monitoring mechanism, which sends the replaced location service request to the location service provider in the location service request through the corresponding service node. The replaced location service request includes the temporary address of the IoT terminal, the location information, the type of the location service request, and the location service provider. In some embodiments, the replaced location service request can also include other content, which is not limited specifically herein.

In step S103, a location service response sent by the location service provider is received. The location service response includes the temporary address, and response information generated by the location service provider based on the location information and the type of the location service request.

In some embodiments, the location service provider receives the location service request sent through the corresponding service node by the blockchain, and generates the response information based on the location information and the type of the location service request. For example, the weather information corresponding to the location information is minus 12 degrees Celsius. The location service provider returns the location service response to the blockchain through the corresponding service node, that is, the blockchain receives the location service response sent by the location service provider through the corresponding service node. The location service response includes the temporary address of the IoT terminal and the above response information.

It can be understood that after this step, the location service response can also be sent to the supervision node for storage, that is, the location service information stored by the supervision node includes the location service response returned by the location service provider.

In step S104, the temporary address in the location service response is replaced with the real address using the smart contract, and a replaced location service response is sent to the IoT terminal.

In some embodiments, the blockchain uploads the location service response returned by the location service provider on-chain and automatically replaces the temporary address with the real address using the smart contract. The blockchain uses an off-chain monitoring mechanism to return the replaced location service response to the IoT terminal corresponding to the real address. The replaced location service response includes the real address of the IoT terminal and the above response information. After receiving the replaced location service response, the IoT terminal displays information and provides services to users.

The method for processing location-based service data according to embodiments of the present disclosure achieves communication between the IoT terminal and the location service provider using the blockchain. The IoT terminal sends the location service request to the blockchain, the blockchain uses the smart contract to replace the real address of the IoT terminal with the temporary address, and sends the replaced location service request to the location service provider. The location service provider generates the response information based on the location information the type of the location service request in the location service request, and returns the location service response to the blockchain. The blockchain replaces the temporary address of the IoT terminal with a real address using the smart contract, and returns the replaced location service response to the IoT terminal. According to the method for processing location-based service data provided in embodiments of the present disclosure, the real address of the IoT terminal is replaced by using the smart contract in the blockchain, thereby preventing the location service provider from obtaining the real address of the IoT terminal, and ensuring that the location based services can still be completed and the location service response can be returned under the condition that the real address of the IoT terminal is not obtained by the location service provider.

Embodiments of the present disclosure disclose a method for processing location-based service data, which further explains and optimizes the technical solution in the previous embodiment.

Figure 2:
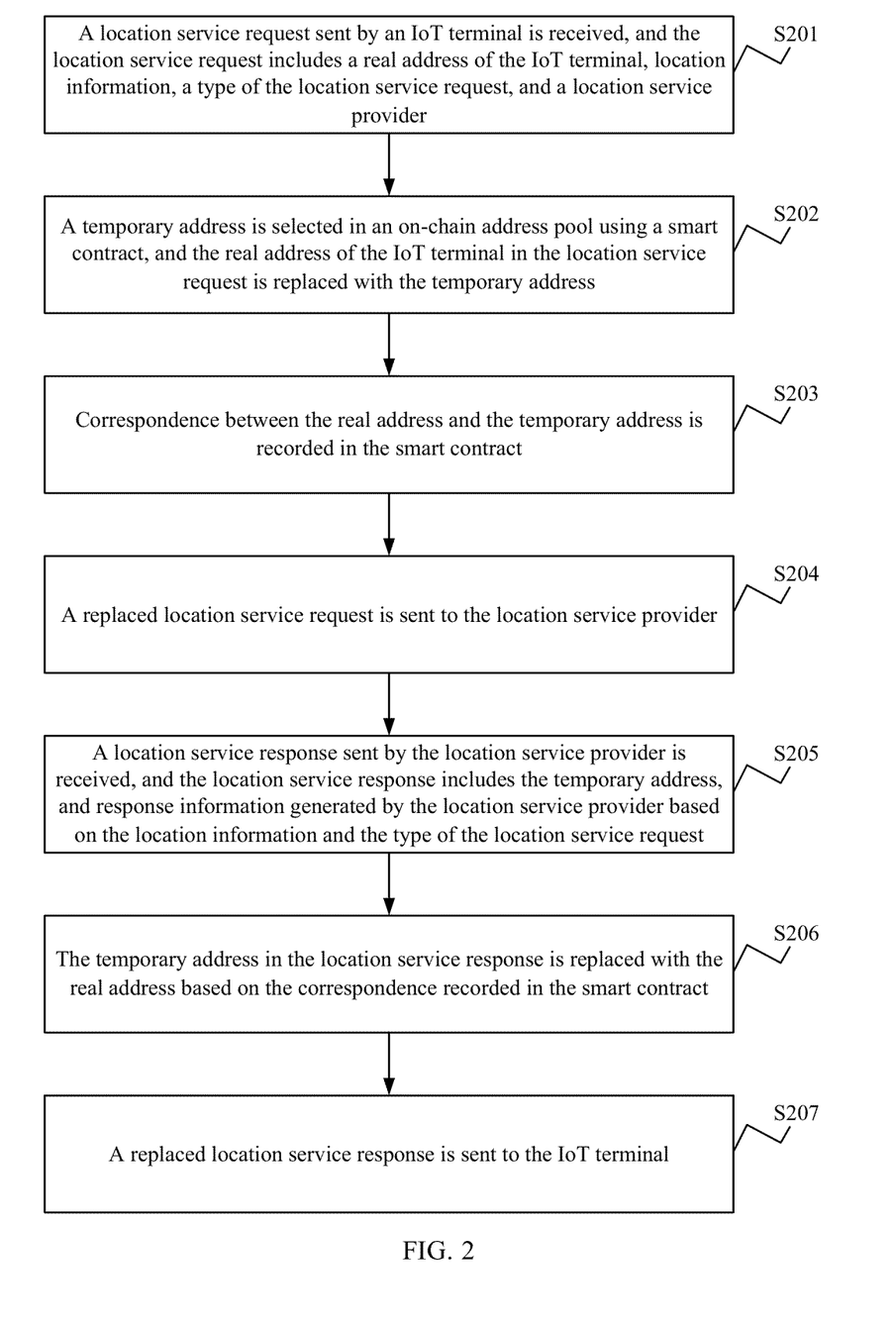
FIG. 2 is a flowchart of a method for processing location-based service data according to some embodiments of the present disclosure.

Reference is made to FIG. 2, a flowchart of a method for processing location-based service data according to embodiments of the present disclosure is provided. As shown in FIG. 2, the method includes following steps.

In step S201, a location service request sent by an IoT terminal is received. The location service request includes a real address of the IoT terminal, location information, a type of the location service request, and a location service provider.

In step S202, a temporary address is selected in an on-chain address pool using a smart contract, and the real address of the IoT terminal in the location service request is replaced with the temporary address.

In step S203, correspondence between the real address and the temporary address is recorded in the smart contract.

In some embodiments, the temporary address is maintained through the on-chain address pool. When receiving a location service request from the IoT terminal, the blockchain randomly selects a temporary address from the on-chain address pool to replace the real address in the location service request, and records the correspondence between the real address and the temporary address in the smart contract.

In step S204, a replaced location service request is sent to the location service provider.

In step S205, a location service response sent by the location service provider is received. The location service response includes the temporary address, and response information generated by the location service provider based on the location information and the type of the location service request.

In step S206, the temporary address in the location service response is replaced with the real address based on the correspondence recorded in the smart contract.

In some embodiments, when receiving a location service response returned by the location service provider, the blocklink replaces the temporary address in the location service response with the corresponding real address based on the correspondence recorded in the smart contract.

In step S207, a replaced location service response is sent to the IoT terminal.

In some embodiments of the present disclosure, selecting the temporary address in the on-chain address pool using the smart contract, and replacing the real address of the IoT terminal in the location service request with the temporary address includes: selecting a temporary address that is in a not-in-use state in the on-chain address pool using the smart contract, replacing the real address of the IoT terminal in the location service request with the temporary address, and updating the state of the temporary address to an in-use state. In some embodiments, after replacing the temporary address in the location service response with the real address based on the correspondence recorded in the smart contract, it further includes updating the state of the temporary address to the not-in-use state.

In some embodiments, the on-chain address pool includes all temporary addresses, with each temporary address corresponding to a state, including an in-use state and a not-in-use state. When receiving the location service request sent by the IoT terminal, the blockchain randomly selects a temporary address that is in a not-in-use state in the on-chain address pool, and after replacing the real address of the IoT terminal in the location service request with the temporary address, the blockchain updates the state of the temporary address in the smart contract from the not-in-use state to the in-use state. When receiving the location service response returned by the location service provider, the blocklink updates the state of the temporary address from the in-use state to the not-in-use state, after the temporary address in the location service response is replaced with the corresponding real address based on the correspondence recorded in the smart contract.

In some embodiments of the present disclosure, after the real address of the IoT terminal in the location service request is replaced with the temporary address, the method further includes: deleting the temporary address from the on-chain address pool. In some embodiments, after the temporary address in the location service response is replaced with the real address based on the correspondence recorded in the smart contract, the method further includes: adding the temporary address back to the on-chain address pool.

In some embodiments, the on-chain address pool includes only the temporary addresses that is not in-use. When receiving the location service request sent by the IoT terminal, the blockchain randomly selects a temporary address from the on-chain address pool, replaces the real address of the IoT terminal in the location service request with the temporary address, and deletes the temporary address from the on-chain address pool. When receiving the location service response returned by the location service provider, the blockchain adds the temporary address back to the on-chain address pool, after the temporary address in the location service response is replaced with the corresponding real address based on the correspondence recorded in the smart contract.

According to embodiments of the present disclosure, the temporary addresses is maintained through an on-chain address pool. When receiving the location service request sent by the IoT terminal, the blockchain randomly selects a temporary address from the on-chain address pool, to replace the real address in the location service request. According to embodiments of the present disclosure, the real address of the IoT terminal is replaced by using the smart contract in the blockchain, thereby preventing the location service provider from obtaining the real address of the IoT terminal, and ensuring that the location based services can still be completed and the location service response can be returned under the condition that the real address of the IoT terminal is not obtained by the location service provider.

Figure 3:
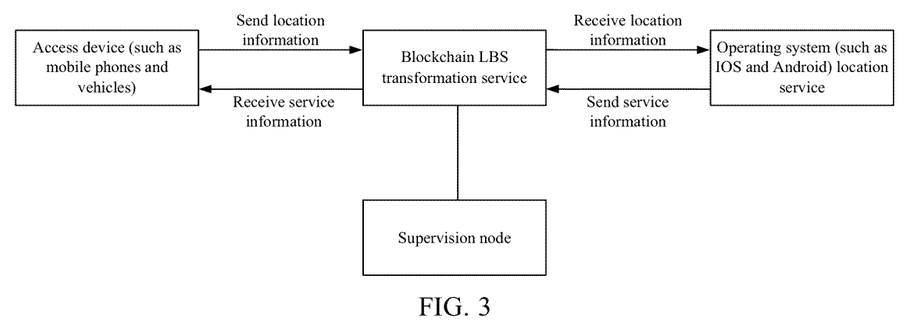
FIG. 3 is a structural diagram of an application case according to some embodiments of the present disclosure.

An application case according to some embodiments of the present disclosure will be introduced in the following. As shown in FIG. 3. a structural diagram of an application embodiment according to some embodiments of the present disclosure is provided, which can include the following steps.

In step 1, a blockchain LBS transformation service alliance chain is established.

Led by the supervisory department, a blockchain LBS transformation service alliance chain is established. Participants in the alliance chain include several supervision nodes and operating system service provider nodes. On a side of the supervision node, a full data storage scheme is adopted, to record LBS transformation service records stored by all operating system service provider nodes. On a side of the operating system service provider, a minimum data storage scheme is adopted, to store only LBS transformation service records related to itself.

In step 2, an access device such as mobile phones and vehicles sends location information.

Mobile phones, vehicles, or other IoT terminals send the location information and the service request to a blockchain LBS transformation service device. Key information fields include "real Mac address of the device; LBS location information; type of the location service request: please return the weather information of the current location to the request from the device; location service provider: IOS operating system".

In step 3, the blockchain LBS transformation service transforms the real Mac address of the device to a temporary Mac address of the device.

The blockchain LBS transformation service uploads the location service request information sent by the IoT terminal such as mobile phones and vehicles on-chain, and automatically replaces the "real Mac address of the device" with the "temporary Mac address of the device" using a smart contract. The temporary Mac address of the device comes from an "on-chain MAC address pool", which randomly stores Mac addresses that are in the "not-in-use" state. When the smart contract automatically randomly selects a Mac address from the "on-chain MAC address pool" as the "temporary Mac address of the device", the state of this address is updated to the "in-use state".

The blockchain LBS transformation service sends the location service request to a designated location service provider using an off-chain monitoring mechanism. Key information fields include "temporary Mac address of the device; LBS location information; type of the location service request: please return the weather information of the current location to the request from the device; location service provider: IOS operating system".

In step 4, an operating system such as IOS and Android receives the location information transformed through LBS.

The IOS operating system receives the location service request sent by the blockchain LBS transformation service, with key information fields including "temporary Mac address of the device; LBS location information; type of the location service request: please return the weather information of the current location to the request from the device; location service provider: IOS operating system".

In step 5, the operating system such as IOS and Android returns the location service information.

The IOS operating system returns the location service information to the blockchain LBS transformation service device based on the type of the location service request. Key information fields include "temporary Mac address of the device; returned location service request information: the weather information of the current location is minus 12 degrees Celsius".

In step 6, the blockchain LBS transformation service transforms the temporary Mac address of the device to the real Mac address of the device.

The blockchain LBS transformation service uploads the location service information returned by the IOS operating system on-chain, and automatically replaces the "temporary Mac address of the device" with the "real Mac address of the device" through the smart contract.

The blockchain LBS transformation service sends the location service information to a designated device using the off-chain monitoring mechanism. Key information fields include "real Mac address of the device; returned location service request information: the weather information of the current location is minus 12 degrees Celsius". At the same time, the smart contract automatically releases the "temporary Mac address of the device" to the "not-in-use" state and puts the address back into the "on-chain Mac address pool".

In step 7, the access device such as mobile phones and vehicles receive the location service information transformed through LBS.

Mobile phones, vehicles, or other access devices receive the location service information transformed through the blockchain LBS. Key information fields include "real Mac address of the device; returned location service request information: the weather information of the current location is minus 12 degrees Celsius", and are used for user oriented information display and service provision.

An apparatus for processing location-based service data according to embodiments of the present disclosure will be introduced in the following. The method for processing location-based service data described above can serve as a reference for the apparatus for processing location-based service data described below.

Figure 4:
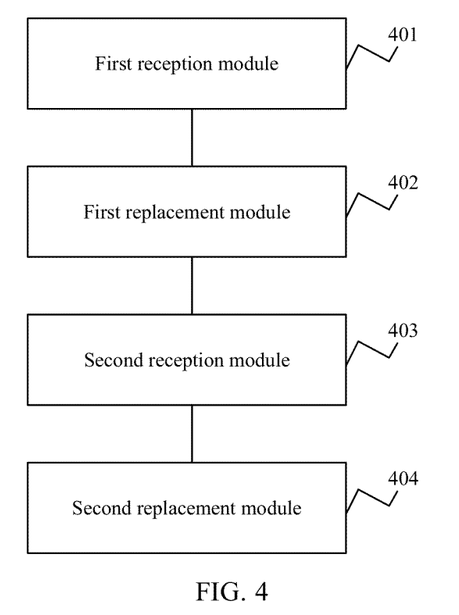
FIG. 4 is a structural diagram of an apparatus for processing location-based service data according to some embodiments of the present disclosure.

Reference is made to FIG. 4, a structural diagram of an apparatus for processing location-based service data according to embodiments of the present disclosure is provided. As shown in FIG. 4, the apparatus includes a first reception module 401, a first replacement module 402, a second reception module 403, and a second replacement module 404.

The first reception module 401 is configured to receive a location service request sent by an IoT terminal. The location service request includes a real address of the IoT terminal, location information, a type of the location service request, and a location service provider.

The first replacement module 402 is configured to replace the real address of the IoT terminal in the location service request with a temporary address using a smart contract, and to send a replaced location service request to the location service provider.

The second reception module 403 is configured to receive a location service response sent by the location service provider. The location service response includes the temporary address, and response information generated by the location service provider based on the location information and the type of the location service request.

The second replacement module 404 is configured to replace the temporary address in the location service response with the real address using the smart contract, and send a replaced location service response to the IoT terminal.

The apparatus for processing location-based service data according to embodiments of the present disclosure achieves communication between the IoT terminal and the location service provider using the blockchain. The IoT terminal sends the location service request to the blockchain, the blockchain uses the smart contract to replace the real address of the IoT terminal with the temporary address, and sends the replaced location service request to the location service provider. The location service provider generates the response information based on the location information the type of the location service request in the location service request, and returns the location service response to the blockchain. The blockchain replaces the temporary address of the IoT terminal with a real address using the smart contract, and returns the replaced location service response to the IoT terminal. According to the method for processing location-based service data provided in embodiments of the present disclosure, the real address of the IoT terminal is replaced by using the smart contract in the blockchain, thereby preventing the location service provider from obtaining the real address of the IoT terminal, and ensuring that the location based services can still be completed and the location service response can be returned under the condition that the real address of the IoT terminal is not obtained by the location service provider.

In some embodiments, the first replacement module 402 includes a first replacement unit, a recording unit and a first sending unit.

The first replacement unit is configured to select a temporary address in an on-chain address pool using a smart contract, and replace the real address of the IoT terminal in the location service request with the temporary address.

The recording unit is configured to record correspondence between the real address and the temporary address in the smart contract.

The first sending unit is configured to send a replaced location service request to the location service provider.

In some embodiments, the second replacement module 404 includes a second replacement unit and a second sending unit.

The second replacement unit is configured to replace the temporary address in the location service response with the real address based on the correspondence recorded in the smart contract.

The second sending unit is configured to send a replaced location service response to the IoT terminal.

In some embodiments, the first replacement unit is specifically configured to select a temporary address that is in a not-in-use state in the on-chain address pool using the smart contract, replace the real address of the IoT terminal in the location service request with the temporary address, and update the state of the temporary address to an in-use state.

In some embodiments, the second replacement module 404 further includes an updating unit.

The updating unit is configured to update the state of the temporary address to a not-in-use state.

In some embodiments, the first replacement module 402 further includes a deleting unit.

The deleting unit is configured to delete the temporary address from the on-chain address pool.

In some embodiments, the second replacement module 404 further includes an adding unit.

The adding unit is configured to add the temporary address back to the on-chain address pool.

In some embodiments, the blockchain includes a service node corresponding to the location service provider.

The first replacement module 402 is specifically configured to replace the real address of the IoT terminal in the location service request with the temporary address using the smart contract, and send the replaced location service request to the location service provider through the corresponding service node.

The second reception module 403 is specifically configured to receive the location service response sent by the location service provider through the corresponding service node.

In some embodiments, the blockchain also includes the supervision node corresponding to the supervisory department. The apparatus further includes a first sending module and a second sending module.

The first sending module is configured to send the location service request to the supervision node after receiving the location service request sent by the IoT terminal.

The second sending module is configured to send the location service response to the supervision node after receiving the location service response sent by the location service provider.

In some embodiments, the location service provider includes an operating system.

Specific implementations of operations performed by modules in the apparatus provided in embodiments of the present disclosure have been described in detail in embodiments related to the methods, and will not be explained in detail herein.

Figure 5:
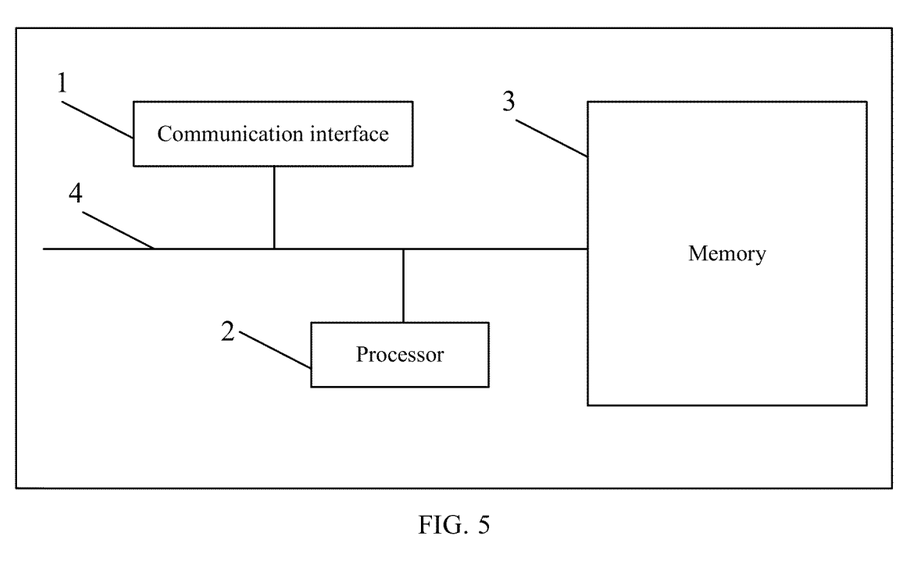
FIG. 5 is a structural diagram of an electronic device according to some embodiments of the present disclosure.

Based on the hardware implementation of the above program modules, and in order to implement the methods provided by embodiments of the present disclosure, an electronic device is further provided in embodiments of the present disclosure. FIG. 5 is a structural diagram of an electronic device according to embodiments. As shown in FIG. 5, the electronic device includes following structures.

A communication interface 1 is capable of exchanging information with other devices such as network devices.

A processor 2 is connected to the communication interface 1 to facilitate information exchange with other devices. The processor 2 is configured to run computer programs, so that the method for processing location-based service data according to one or more embodiments can be implemented. The computer programs are stored on a memory 3.

In practical applications, various components in the electronic device are coupled together through a bus system 4. The bus system 4 is used to achieve connection and communication between these components. The bus system 4 includes not only a data bus, but also a power bus, a control bus, and a state signal bus. However, various buses are labeled as the bus system 4 in FIG. 5, for clarity.

The memory 3 in embodiments of present disclosure is used to store various types of data to support the operation of the electronic device. Examples of these data include any computer program can be executed on the electronic device.

It can be understood that the memory 3 can be either volatile or nonvolatile memory, and can also include both volatile and nonvolatile memory. The nonvolatile memory can be read only memory (ROM), programmable read only memory (PROM), erasable programmable read only memory (EPROM), electrically erasable programmable read only memory (EEPROM), ferromagnetic random access memory (FRAM), flash memory, magnetic surface storage, optical disc, or compact disc read only memory. The magnetic surface storage can be either magnetic disk storage or magnetic tape storage. The volatile memory can be random access memory (RAM), which is used as an external cache. By way of example but not limitation, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), syncLink dynamic random access memory (SLDRAM), and direct rambus random access memory (DRRAM). The memory 2 described in embodiments of present disclosure aims to include but not limited to these and any other suitable types of memory.

The method disclosed in the above embodiments of present disclosure can be applied to processor 2 or implemented by processor 2. The processor 2 may be an integrated circuit chip with signal processing capabilities. During the implementation process, each step of the above methods can be completed through the integrated logic circuit of the hardware in processor 2 or instructions in the form of software. The aforementioned processor 2 can be a general-purpose processor, DSP, or other programmable logic devices, discrete gates or transistor logic devices, discrete hardware components, etc. The processor 2 can implement or execute the disclosed methods, steps, and logical block diagrams in embodiments of the present disclosure. The general-purpose processor can be a microprocessor or any conventional processor. The steps of the methods disclosed in embodiments of the present disclosure can be directly reflected in the completion of execution by a hardware decoding processor, or in combination of hardware and software modules in the decoding processor. The software module can be located in a storage medium, which is located in memory 3. The processor 2 reads the program in memory 3 and completes the steps of the aforementioned methods in combination with its hardware.

When processor 2 executes the program, the corresponding processes in each method embodiment of the present disclosure is caused to be implemented, which will not be repeated herein, for simplicity.

In some embodiments, the present disclosure also provides a storage medium, namely a computer storage medium, specifically a computer readable storage medium, such as a memory 3 for storing computer programs, which can be executed by processor 2 to complete steps described in the aforementioned methods. The computer readable storage media can be memories such as FRAM, ROM, PROM, EPROM, EEPROM, Flash Memory, magnetic surface memory, optical disc, or CD-ROM.

Those of ordinary skill in the art can understand that all or part of the steps to implement the above method embodiments can be completed through hardware related to program instructions. The aforementioned programs can be stored in a computer readable storage medium, and when executed, the programs execute the steps including the above method embodiments. The aforementioned storage media include various media that can store program codes, such as mobile storage devices, ROM, RAM, magnetic disks, or optical disks.

Alternatively, if the integrated unit mentioned in the present disclosure is implemented in the form of a software functional module and sold or used as an independent product, it can also be stored on a computer readable storage medium. Based on this understanding, the technical solution of the embodiments of the present disclosure, or the portion that contributes to the existing technology, can be reflected in the form of a software product, which is stored in a storage medium and includes several instructions to enable an electronic device (which can be a personal computer, server, or network device, etc.) to execute all or part of the methods described in the embodiments of the present disclosure. The aforementioned storage media include various media that can store program code, such as mobile storage devices, ROM, RAM, magnetic disks, or optical disks.

The above is only the specific implementation method of the present disclosure, but the protection scope of the present disclosure is not limited to this. Any technical personnel familiar with this technical field who can easily think of changes or replacements within the scope of technology disclosed in the present disclosure should be covered within the protection scope of the present disclosure. Therefore, the protection scope of the present disclosure should be based on the protection scope of the claimed rights.

What is claimed is:

1. A method for processing location-based service data, applied to a blockchain, comprising:

receiving a location service request sent by an Internet of Things (IoT) terminal, wherein the location service request comprises a real address of the IoT terminal, location information, a type of the location service request, and a location service provider;

replacing the real address of the IoT terminal in the location service request with a temporary address using a smart contract, and sending a replaced location service request to the location service provider;

receiving a location service response sent by the location service provider, wherein the location service response comprises the temporary address, and response information generated by the location service provider based on the location information and the type of the location service request; and replacing the temporary address in the location service response with the real address using the smart contract, and sending a replaced location service response to the IoT terminal.

2. The method for processing location-based service data according to claim 1, wherein replacing the real address of the IoT terminal in the location service request with the temporary address using the smart contract comprises: selecting a temporary address in an on-chain address pool using the smart contract, to replace the real address of the IoT terminal in the location service request with the temporary address, and recording correspondence between the real address and the temporary address in the smart contract; and wherein replacing the temporary address in the location service response with the real address using the smart contract comprises: replacing the temporary address in the location service response with the real address based on the correspondence recorded in the smart contract.

3. The method for processing location-based service data according to claim 2, wherein selecting a temporary address in the on-chain address pool using the smart contract, to replace the real address of the IoT terminal in the location service request with the temporary address comprises: selecting a temporary address that is in a not-in-use state in the on-chain address pool using the smart contract, replacing the real address of the IoT terminal in the location service request with the temporary address, and updating the state of the temporary address to an in-use state; and wherein after replacing the temporary address in the location service response with the real address based on the correspondence recorded in the smart contract, the method further comprises: updating the state of the temporary address to the not-in-use state.

4. The method for processing location-based service data according to claim 2, wherein after replacing the real address of the IoT terminal in the location service request with the temporary address, the method further comprises: deleting the temporary address from the on-chain address pool; and wherein after replacing the temporary address in the location service response with the real address based on the correspondence recorded in the smart contract, the method further comprises: adding the temporary address back to the on-chain address pool.

5. The method for processing location-based service data according to claim 1, wherein the blockchain comprises a service node corresponding to the location service provider, and wherein sending the replaced location service request to the location service provider comprises: sending the replaced location service request to the location service provider through a corresponding service node; and wherein receiving the location service response sent by the location service provider comprises: receiving the location service response sent by the location service provider through the corresponding service node.

6. The method for processing location-based service data according to claim 5, wherein the blockchain further comprises a supervision node corresponding to a supervisory department, and wherein after receiving the location service request sent by the IoT terminal, the method further comprises: sending the location service request to the supervision node; and wherein after receiving the location service response sent by the location service provider, the method further comprises: sending the location service response to the supervision node.

7. The method for processing location-based service data according to claim 1, wherein the location service provider comprises an operating system.

8. A non-transitory computer-readable storage medium having a computer program stored thereon, which when executed by a processor, cause steps of the method for processing location-based service data according to claim 1 to be performed.

9. The method for processing location-based service data according to claim 5, wherein the service node adopts a minimum data storage scheme.

10. The method for processing location-based service data according to claim 6, wherein the supervision node adopts a full data storage scheme.

11. The method for processing location-based service data according to claim 1, wherein the type of the location service request comprises weather information corresponding to the location information.

12. An electronic device, applied to a blockchain, comprising:

a memory for storing a computer program; and a processor for executing the computer program, wherein the processor is configured to:

receive a location service request sent by an Internet of Things (IoT) terminal, wherein the location service request comprises a real address of the IoT terminal, location information, a type of the location service request, and a location service provider;

replace the real address of the IoT terminal in the location service request with a temporary address using a smart contract, and send a replaced location service request to the location service provider;

receive a location service response sent by the location service provider, wherein the location service response comprises the temporary address, and response information generated by the location service provider based on the location information and the type of the location service request; and replace the temporary address in the location service response with the real address using the smart contract, and send a replaced location service response to the IoT terminal.

13. The electronic device according to claim 12, wherein the processor is further configured to: select a temporary address in an on-chain address pool using the smart contract, to replace the real address of the IoT terminal in the location service request with the temporary address, and record correspondence between the real address and the temporary address in the smart contract; and wherein the processor is further configured to replace the temporary address in the location service response with the real address based on the correspondence recorded in the smart contract.

14. The electronic device according to claim 13, wherein the processor is further configured to: select a temporary address that is in a not-in-use state in the on-chain address pool using the smart contract, replace the real address of the IoT terminal in the location service request with the temporary address, and update the state of the temporary address to an in-use state; and wherein the processor is further configured to update the state of the temporary address to the not-in-use state.

15. The electronic device according to claim 13, wherein the processor is further configured to delete the temporary address from the on-chain address pool; and wherein the processor is further configured to add the temporary address back to the on-chain address pool.

16. The electronic device according to claim 12, wherein the blockchain comprises a service node corresponding to the location service provider, and wherein the processor is further configured to send the replaced location service request to the location service provider through a corresponding service node; and wherein the processor is further configured to receive the location service response sent by the location service provider through the corresponding service node.

17. The electronic device according to claim 16, wherein the blockchain further comprises a supervision node corresponding to a supervisory department, and wherein the processor is further configured to send the location service request to the supervision node; and wherein the processor is further configured to send the location service response to the supervision node.

18. The electronic device according to claim 12, wherein the location service provider comprises an operating system.

* * * * *